United States Patent
Kasahara

(10) Patent No.: US 6,685,255 B2
(45) Date of Patent: Feb. 3, 2004

(54) PART INSTALLATION STRUCTURE FOR VEHICLE

(75) Inventor: Hisao Kasahara, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/214,711

(22) Filed: Aug. 9, 2002

(65) Prior Publication Data
US 2003/0035698 A1 Feb. 20, 2003

(30) Foreign Application Priority Data
Aug. 14, 2001 (JP) .................................... P.2001-246175

(51) Int. Cl.$^7$ .................................................. B60J 7/00
(52) U.S. Cl. .................... 296/180.1; 296/209; 411/85; 411/107; 411/173
(58) Field of Search .............................. 296/209, 180.1, 296/185; 293/128; 411/84, 85, 107, 173, 174, 175

(56) References Cited

U.S. PATENT DOCUMENTS

| 4,607,878 A | * | 8/1986 | Itoh ........................ 296/199 |
| 4,784,554 A | * | 11/1988 | Break ........................ 411/383 |
| 4,907,923 A | * | 3/1990 | McGrath, Jr. ................ 411/107 |
| 4,911,495 A | * | 3/1990 | Haga et al. ................ 296/209 |
| 6,030,030 A | * | 2/2000 | Riddle et al. ............... 296/209 |
| 6,102,473 A | * | 8/2000 | Steininger et al. .......... 296/209 |

FOREIGN PATENT DOCUMENTS

JP          62-110610        7/1987

* cited by examiner

Primary Examiner—Joseph D. Pape
(74) Attorney, Agent, or Firm—McGinn & Gibb, PLLC

(57) ABSTRACT

Apart installation structure for a vehicle for attaching a part to a vehicle body through a bracket using an access hole established in the vehicle body and a surrounding portion of the access hole, comprises a bolt including a head capable of passing through the access hole and a thread section projecting from the head and passing through the access hole, a plate member including an opening section and capable of being attached to the thread section through the opening section, a nut for being screwed onto the thread section and for tightening the surrounding portion, the plate member and the bracket altogether, and a rotation stopper provided on the bracket for contacting the head after passing through the opening section and the access hole so as to restrict a rotation when the nut is screwed in.

3 Claims, 2 Drawing Sheets

PART INSTALLATION STRUCTURE FOR VEHICLE

BACKGROUND OF THE INVENTION

1. Field of the Invention

The present invention relates to a part installation structure for attaching a part to a vehicle and more particularly to the part installation structure for attaching a long exterior part such as a side under spoiler to a vehicle body in a simple and efficient way.

2. Discussion of Prior Art

In general, exterior parts such as air spoilers are attached to a vehicle using access holes already established in a vehicle body. In case of an access hole with small diameter, plastic clips sold in markets are effective for fixing parts on the vehicle. However, in case where an available access hole has a large diameter, plastic clips sold in markets sometimes are not suitable for an access hole with large diameter. In this case, a dedicated plastic clip must be newly designed and therefore manufacturing cost increases.

Hence, a so-called T-head bolt is used for fixing parts to the vehicle body. Since the T-head bolt has a head shaped into a rectangle, a short side head can freely pass through an access hole and a long side head can be engaged with the access hole.

However, this method of fixing parts to the vehicle body has problems. First, when the T-head bolt is tightened with a nut and the like, the T-head bolt itself rotates. Secondly, when a part is attached to the vehicle body, particularly in case where the part has a long size configuration like a side under spoiler, a plurality of brackets of the part must be attached to the vehicle body with a plurality of T-head bolts and nuts. In this case, since the T-head bolts themselves are easily movable, even if one T-head bolt passes through a bracket hole, other T-head bolts do not pass through bracket holes successfully. Further, When a nut is tried to be fitted over a T-head bolt, the T-head bolt also is pushed upwards and installation works do not go well.

To solve these problems, Japanese Utility Model Application Laid-open No. Jitsu-Kai-Show 62-110610 discloses a technique in which nuts are welded on an inner surface of a side sill beforehand and brackets are attached to a vehicle body using these nuts. However, this method has a disadvantage in that manufacturing cost of the vehicle increases and particularly when the part is an optional part, these nuts are of no use.

SUMMARY OF THE INVENTION

It is an object of the present invention to provide an installation structure capable of attaching parts to a vehicle body in a simple and efficient way.

To achieve the object, the installation structure for attaching a part to a vehicle body through a bracket using an access hole established in the vehicle body and a surrounding portion of the access hole, comprises a bolt including a head capable of passing through the access hole from one side to the other side of the access hole and prohibited to pass through the access hole from the other side to one side of the access hole and a thread section projecting from the head and passing through the access hole toward the other side of the access hole, a plate member including an opening section and capable of being attached to the thread section through the opening section of the plate member and for interleaving the surrounding portion of the access hole with the head so as to prohibit a longitudinal displacement of the bolt, a nut for being screwed onto the thread section and for tightening the surrounding portion of the access hole, the plate member and the bracket altogether, and a rotation stopper provided on the bracket for contacting the head after passing through the opening section of the plate member and the access hole of the vehicle body so as to restrict a rotation of the bolt.

DESCRIPTION OF THE PREFERRED EMBODIMENT

Figure 1:
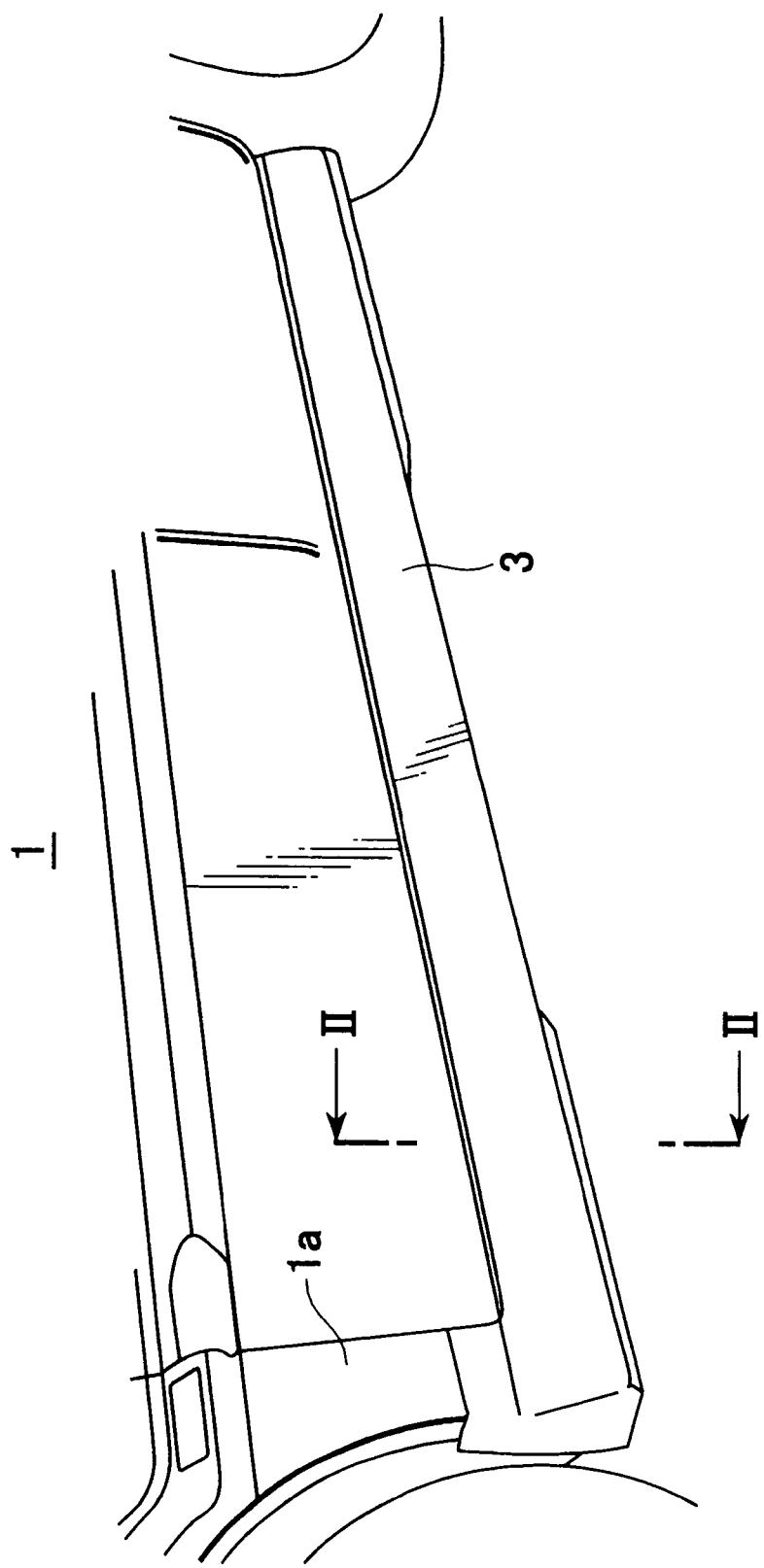
FIG. 1 is a perspective view showing a side under spoiler installed on a vehicle.
Figure 2:
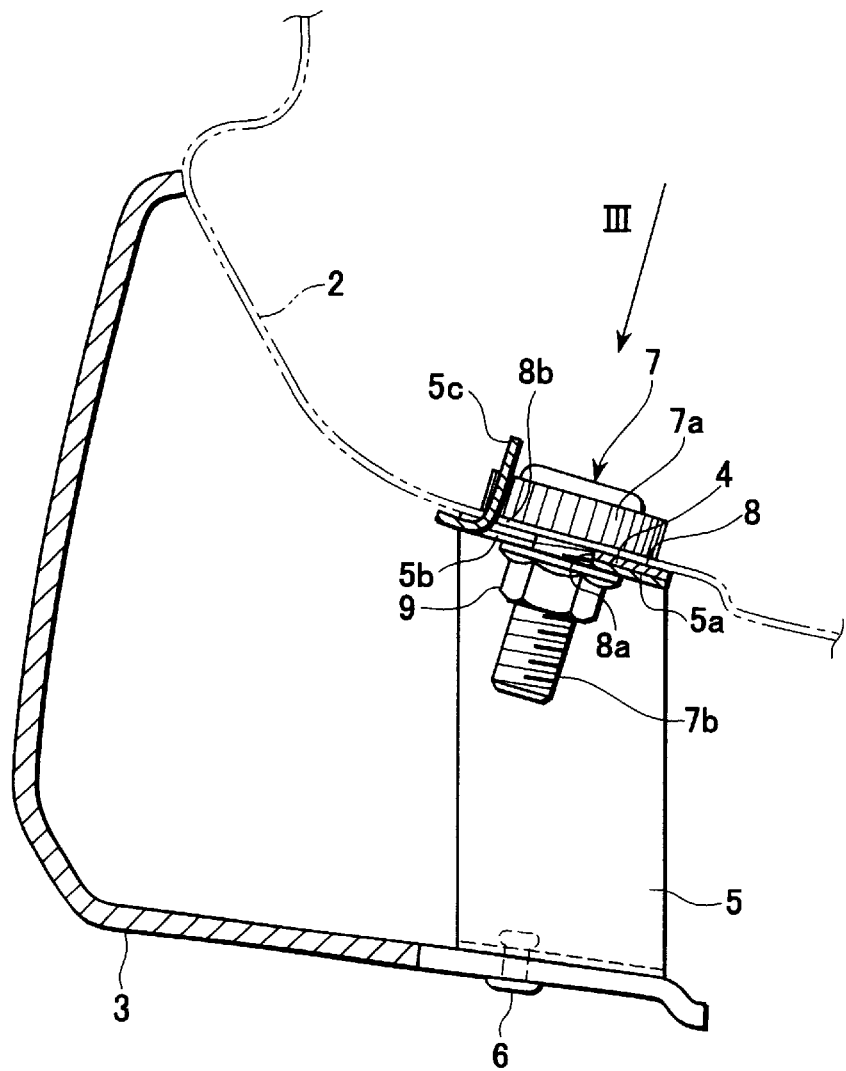
FIG. 2 is a sectional view taken along a line II—II of FIG. 1.
Figure 3:
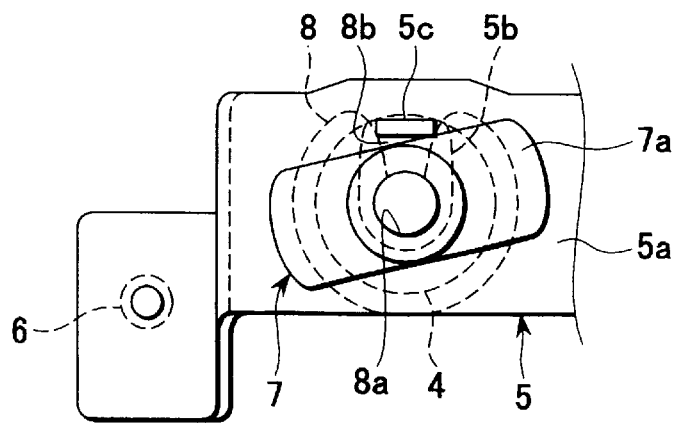
FIG. 3 is a top view as viewed in a direction of III of FIG. 2.

Referring to FIGS. 1, 2 and 3, reference numeral 1 denotes a vehicle body and reference numeral 2 denotes a side sill and reference numeral 3 denotes a side under spoiler attached to the vehicle body. The side under spoiler 3 is connected at a front end thereof with a lower end of a fender panel 1a and is connected at a longitudinal side thereof with the side sill 2 in such a manner that the side under spoiler 3 covers the side sill 2 from outside.

The side under spoiler 3 is integrally secured by a rivet 6 to a metal made bracket 5 which is attached to the side sill 2 using a plurality of large diameter access holes 4.

The bracket 5 is secured to the side sill 2 by a T-head bolt 7 having a head 7a formed into a rectangular plate. First, the head 7a of the T-head bolt 7 is passed through a large diameter access hole 4 by making use of a short side thereof from one side of the side sill 2 and a long side of the head 7a is held across the access hole 4 by a surrounding portion of the access hole 4. As a result, the T-head bolt 7 never comes out of the side sill 2.

A thread section 7b is projected from the head 7a of the T-head bolt 7 outside of the side sill 2 and a plate member 8 is inserted to the thread section 7b so as to interleave the surrounding portion of the access hole 4 of the side sill 2.

The plate member 8 is a C-type clip made of elastically plastic material and formed into a disc having a larger diameter than that of the access hole 4 and has a hole 8a having a diameter equal to or smaller than a root diameter of the thread section 7b of the T-head bolt. Further, the plate member 8 has an opening section 8b gradually widening toward an outer edge thereof.

The outer surface of the plate member 8 contacts a mounting surface 5a of the bracket 5 and a slot 5b is formed on the mounting surface 5a. The thread section 7b of the T-head bolt 7 penetrates the slot 5b. On the other hand, a rotation stopper 5c is integrally formed with the bracket 5 on an opposite side of the thread section 7b, extending vertically toward the side sill 2. The rotation stopper 5c passes through the opening section 8b and the access hole 4 and contacts a side surface of the head 7a of the T-head bolt 7.

A washer based nut 9 is screwed onto the thread section 7b of the T-head bolt 7 from an opposite side of the mounting surface 5a of the bracket 5 and as a result the side sill 2, the plate member 8 and the bracket 5 are fastened together between the head section 7a of the T-head bolt 7 and the washer based nut 9.

Next, processes for installing the bracket 5 will be described.

First, the T-head bolt 7 is held in the access hole 4 of the side sill 2. That is, the head 7a of the T-head bolt 7 is inserted to the access hole 4 along the long side thereof from outside of the side sill 2 and the long side of the T-head bolt 7 is held by the access hole 4, correctly by the surrounding portion of the access hole 4 so as not to come out of the side sill 2.

Then, the hole 8a of the plate member 8 is slidably fitted over the thread section 7b of the T-head bolt 7 projected from the side sill 2 through the opening section 8b thereof.

Thus, the surrounding portion of the access hole 4 of the side sill 2 is interleaved between the head 7a of the T-head bolt 7 and the plate member 8. Since the thread section 7b is tightly fitted to the hole 8a of the plate member 8 and is pressed by the spring force of the plate member 8, the longitudinal or axial displacement of the T-head bolt 7 is prohibited and the T-head bolt 7 is stably held by the vehicle body.

Next, when the thread section 7b of the T-head bolt 7 is passed through the slot 5b provided on the mounting surface 5a of the bracket 5, the rotation stopper 5c is passed through the opening section 8b of the plate member 8 and the access hole 4 of the side sill 2 and contacts the side surface of the head 7a of the T-head bolt 7. When the thread section 7b passes through the slot 5b, even if a force to displace the thread section 7b upwards (toward inside of the side sill 2) is applied to the thread section 7b, since the displacement of the T-head bolt 7 is restricted by the plate member 8, the T-head bolt 7 is never pushed up toward inside of the side sill 2.

Then, the washer based nut 9 is screwed onto the thread section 7b of the T-head bolt 7 to fasten the side sill 2, the plate member 8 and the mounting surface 5a of the bracket 5. Since the T-head bolt 7 is prevented from rotating by the rotation stopper 5c, the T-head bolt 7 never rotates when the washer based nut 9 is screwed.

In summary, according to the embodiment of the present invention, since the T-head bolt 7 is held stably so as not to move toward inside of the side sill 2 by the plate member 8, further since the rotation stopper 5c restricts the rotation of the T-head bolt 7 when the washer based nut 9 is screwed, the installation work goes smoothly.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A part installation structure for a vehicle for attaching apart to a vehicle body through a bracket using a hole established in said vehicle body and a surrounding portion of said hole of said vehicle body, comprising:

a bolt including a head capable of passing through said hole from one side to the other side of said hole and prohibited to pass through said hole from the other side to said one side of said hole and a thread section projecting from said head and passing through said hole toward the other side of said hole;

a plate member including an opening section and capable of being attached to said thread section through said opening section and for interleaving said surrounding portion of said hole with said head so as to prohibit a longitudinal displacement of said bolt;

a nut for being screwed onto said thread section and for tightening said surrounding portion of said hole and said plate member and said bracket altogether; and a stopper provided on said bracket for contacting said head after passing through said opening section of said plate member and said hole of said vehicle body so as to restrict a rotation of said bolt.

2. The part installation structure according to claim 1, wherein said plate member is a C-type clip made of elastically plastic material.

3. The part installation structure according to claim 1, wherein said part is a side under spoiler installed under a lower edge of a side body of said vehicle.

* * * * *